N. G. LAWSON.
BEET DRILL.
APPLICATION FILED NOV. 28, 1911.
1,044,398.
Patented Nov. 12, 1912.
3 SHEETS—SHEET 1.
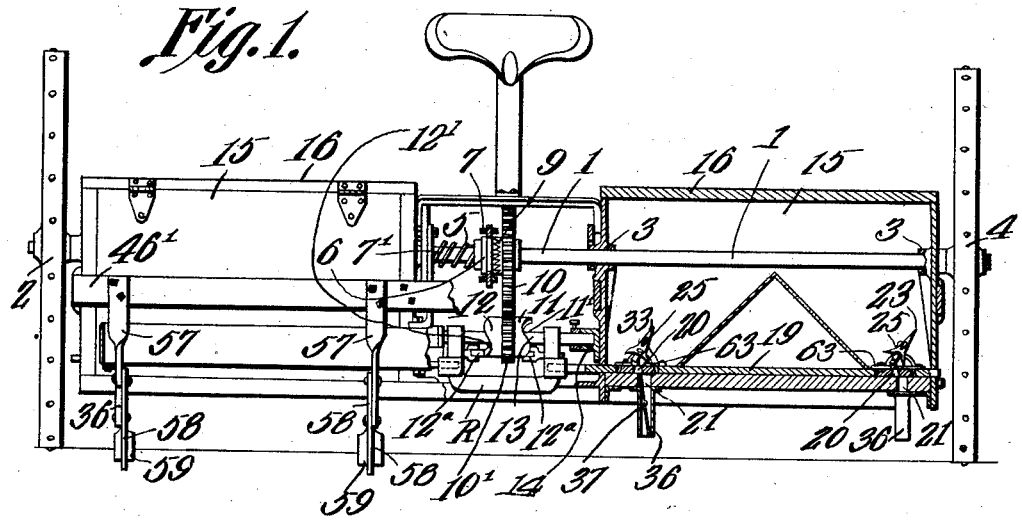
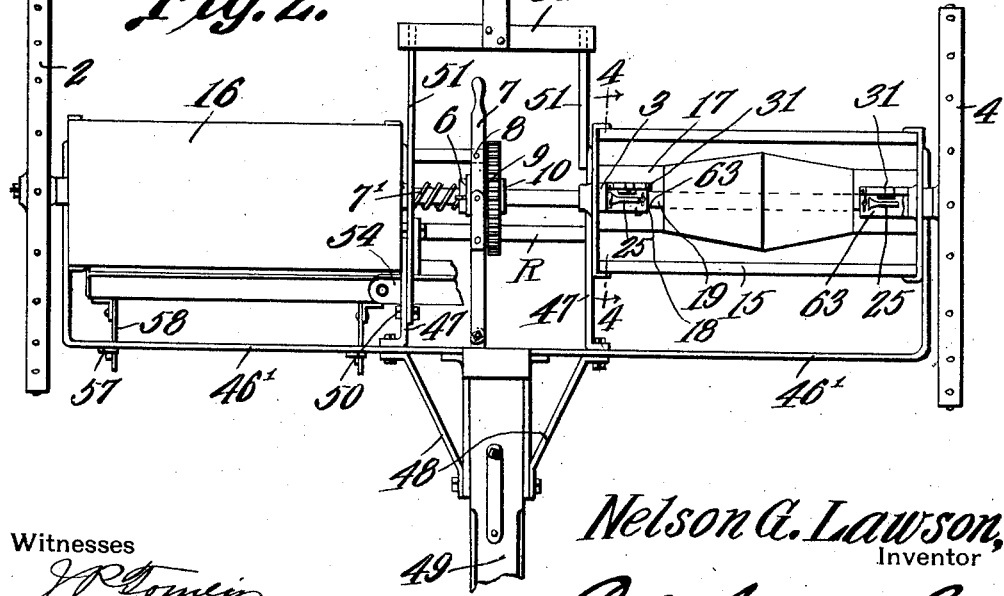
Witnesses
Nelson G. Lawson,
Inventor
by C. A. Snow & Co.
Attorneys

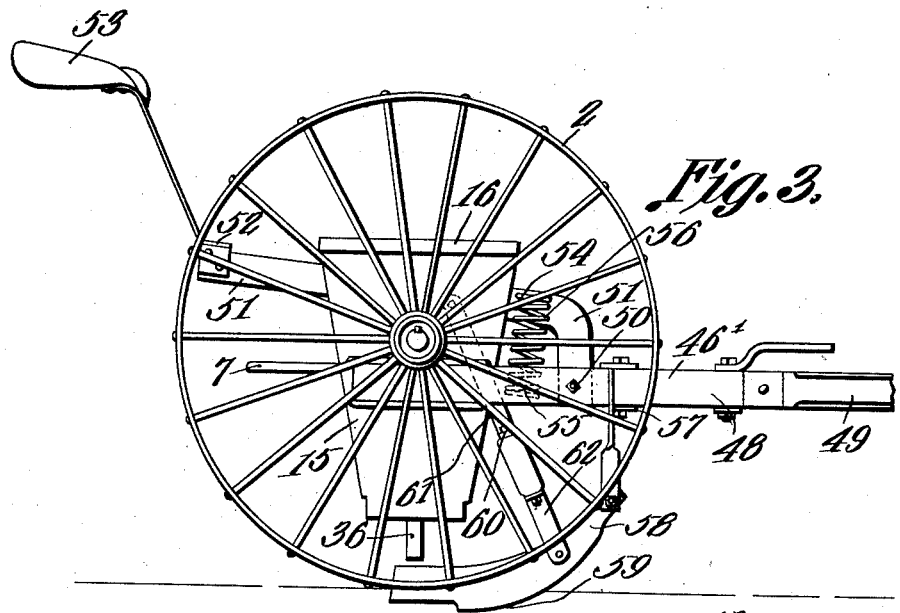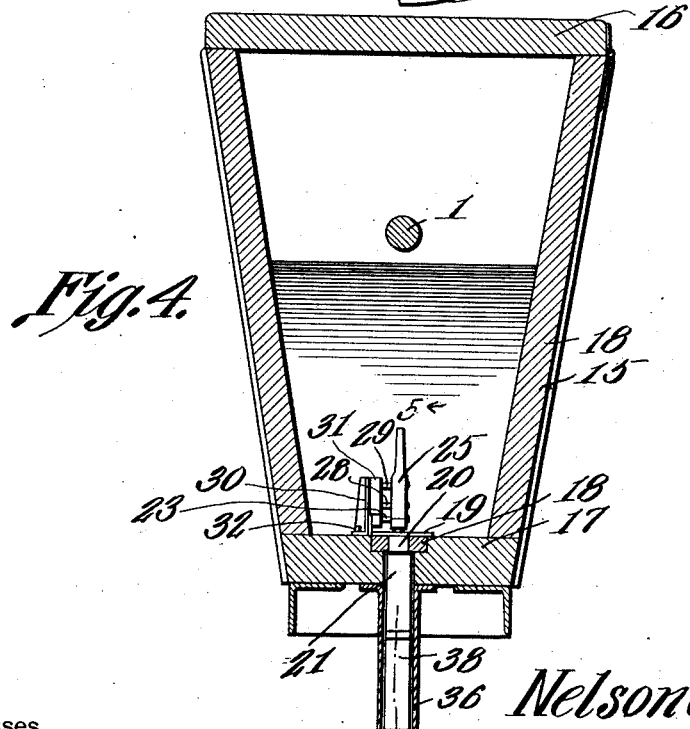

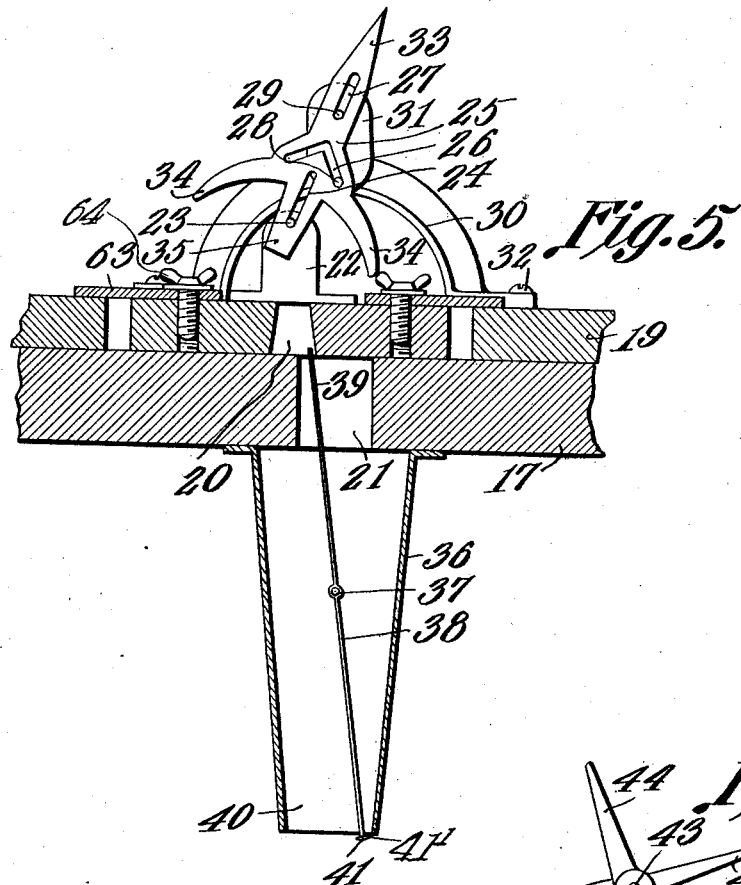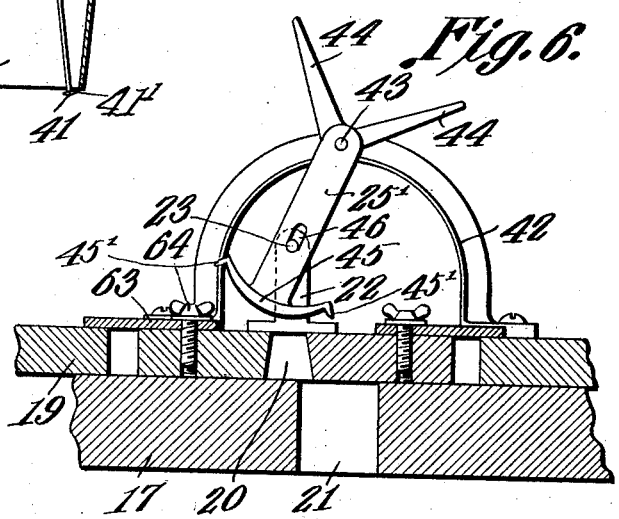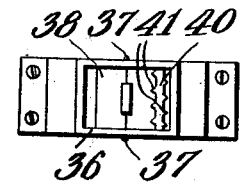

UNITED STATES PATENT OFFICE.

NELSON G. LAWSON, OF DENVER, COLORADO.

BEET-DRILL.

1,044,398.  Specification of Letters Patent.  Patented Nov. 12, 1912.

Application filed November 28, 1911. Serial No. 662,892.

*To all whom it may concern:*

Be it known that I, NELSON G. LAWSON, a citizen of the United States, residing at Denver, in the county of Denver and State of Colorado, have invented a new and useful Beet-Drill, of which the following is a specification.

The present invention relates to improvements in beet drills, the primary object of the invention being the provision of a drill whereby a plurality of rows of seed may be planted simultaneously, a peculiar construction of seed feeding mechanism being disposed within the respective seed hoppers and in coactive relation with means for preventing the seed from scattering in the dispensing or discharging spouts so that the said seed in the proper quantity may be delivered to the furrow formed by its respective shovel or furrow opener.

A further object of the invention is the provision of a drill provided with a transversely disposed oscillatory bar within the respective hoppers thereof in combination with means for imparting such movement thereto through the tractor of the machine, said bar being operably disposed to operate a seed feeder and agitator disposed above a discharge opening in said bar, whereby the seed are properly fed to the discharge spouts of the machine with every reciprocation of the bar and at predetermined intervals so that the desired quantity of seed to constitute a "hill" will be fed to and through the spouts at the desired and predetermined intervals.

With the foregoing and other objects in view which will appear as the description proceeds, the invention resides in the combination and arrangement of parts and in the details of construction hereinafter described and claimed, it being understood that changes in the precise embodiment of invention herein disclosed can be made without in the scope of what is claimed without departing from the spirit of the invention.

In the drawings Figure 1 is a front elevation of the complete machine one of the hoppers being shown in longitudinal section. Fig. 2 is a top plan view of the machine with the cover of one hopper removed. Fig. 3 is a side view taken from the right of the machine as viewed in Fig. 2. Fig. 4 is a section taken on line 4—4 of Fig. 2. Fig. 5 is an enlarged detail sectional view on line 5—5 of Fig. 4 through a portion of the hopper and discharge spout adjacent to the reciprocatory bar and seed feeding and agitating means. Fig. 6 is a similar view minus the discharge spout showing a modified form of agitator and seed feeder. Fig. 7 is a bottom plan view of the discharge spout showing the seed dropping apron therewithin.

Referring to the drawings, the numeral 1 designates a rotatably mounted axle or shaft having keyed upon one end the tractor wheel 2, said shaft 1 being rotatably mounted in the respective boxes 3 and having the other wheel 4 rotatably mounted upon the opposite end to the wheel 2. Near the central portion of the shaft 1 is provided a key 5 upon which is slidably mounted the sliding clutch member 6 which is controlled by the hand lever 7, the spring 7' normally holding the clutch in operative relation while the pin 8 is disposed to hold the lever and the clutch out of engagement. The clutch member 9 is carried by the rotatable gear 10, which when operably engaged by the clutch member 6 will cause the rotation of the gear 10 with the shaft 1, so that the smaller gear 10', meshing at all times with the gear 10 will receive the desired motion therefrom and rotate its respective sleeves 11 and 12 provided with the oppositely disposed cam surfaces 11' and 12' respectively.

The shaft 13 secured in the boxing 14 Fig. 1 carries the gear 10' and the cam sleeves 11 and 12 with the cam surfaces 11' and 12', respectively, so that the anti-frictional rollers 12ª will engage their respective cam surfaces and during the rotation of said gear 10' impart a reciprocatory movement to the frame R which is supported upon the shaft 13 as clearly illustrated in Fig. 1.

The two hoppers 15 are provided with the covers 16 while the bottoms 17 thereof are each provided with the longitudinally disposed recess 18 for the sliding reception of the respective bars 19, whose inner ends are connected to the frame R so that the reciprocatory movement imparted to the said frame R will impart a similar movement to the bars 19 to cause the seed exit port or aperture 20 to be brought into and out of registration with the discharge opening 21 formed in the bottom of the respective hoppers.

Connected to be movable with the respective bars 19 one to each opening 20 thereof, is a bracket or lug 22 carrying a pin or stud 23 which is mounted in the elongated slot 24 of the seed agitator and feeder 25. This feeder, as clearly shown in detail in Fig. 5 and in the preferred form, is provided with the inverted V-shaped slot 26 and the upper vertical slot 27 which is above and in line with the slot 24 thereof, the respective slots 26 and 27 surrounding their respective pins 28 and 29 carried by the projection 31 of the frame 30, said frame 30 being connected to the bottom 17 to one side of the recess 18 and bar 19. By this means it will be seen that any reciprocation imparted to the bar 19 will move the lug 22 and through its pin 23, impart a swinging movement to the seed agitator and feeder 25, the inverted V-shaped slot 26 causing the lower end 35 of the said agitator to be moved down toward the discharge aperture 20, while its curved arms 34 will be given a similar movement so that the seed will be moved toward the aperture 20 by the respective arms 34 during the reciprocation or swinging movement of the agitator and feeder 25, the upper pointed end 33 of said feeder or agitator stirring the mass or bulk of the seed within the hopper so as to prevent the same from caking. The movement imparted to the projection 35 of the agitator or seed feeder will cause the projection 35 to enter the aperture 20 when the projection 3 is in its lowermost position, thus closing the aperture, and ejecting only the desired charge of seed within said aperture 20 into the opening 21 and spout 36. This spout 36 is connected to the under side of the bottom 17 and is disposed to carry the seed as near the ground as possible. This seed agitator or feeder 25, due to the reciprocation of the bar 19, feeds the seeds toward the aperture 20 each oscillation thereof, the arm 34 at the left, as viewed in Fig. 5, when moved to the right, shoving the seed into the aperture 20, while upon the movement of the feeder 25 from right to left, the arm 35 is moved to feed the seed to the hopper. By reason of the pin 28 and the inverted V-shaped slot 26, and the pin and slot connection 23—24 between the lugs 22 and the feeder 25, a peculiar upward and downward movement during the oscillation of the feeder is imparted thereto. Thus when the projection 35 alines with the aperture 20, the pins 23, 28 and 29 are in vertical alinement and by reason of the inverted V-shaped slot 26, the pin 28 is at its apex, so that the projection 35, as before stated, is in its lowermost position and within the aperture 20. The oscillating of the feeder 25 causes the slot 26 to slide over the pin 28, the inclined portion of the slot gradually lifting the projection 35 from the aperture 20 and imparting a rocking movement to the arm 34 and in fact the complete agitator or feeder 25. The said discharge spout 36 has mounted transversely thereof a pin 37 which carries the swinging seed trap and holder 38, whose extreme upper end 39 is projected through the aperture 21 of the bottom 17 and terminates slightly within the aperture 20 of the sliding bar 19. Thus the reciprocation of the bar 19 will move the upper end 39 of the said trap 38 and impart an opposite movement to the lower end 40 thereof, so that the seed ejected through the apertures 20 and 21 into the spout 36 will fall upon one side of the lower end 40 of said trap 38, to be retained until the full charge has been deposited at the bottom of the spout 36. Upon the lower edge of the said trap 38 are provided the oppositely disposed prongs or teeth 41 which are adapted to provide a plurality of apertures or openings at the lower end of the pocket formed in the lower end of the spout 36 to permit the seed to properly enter the furrow without scattering the same.

In the form of agitator and feeder as shown in Fig. 6, the usual lug or bracket 22 with the pin 23 is provided, while connected to the bottom is a U-shaped frame 42 which corresponds with the frame 30 and carries a single pin 43 upon which is pivoted the seed agitator and feeder 25′, the same being provided with the upper agitating arms 44, the lower seed feeding segmental plate 45 and prongs 45′, which act both as a means for feeding the seed into the aperture 20 and also as a cut-off, and the slot 46 mounted upon the pin 23 imparting the desired movement thereto as the bar 19 is reciprocated. The pin 43 provides a fixed pivot for the agitator 25′, and as the agitator is so mounted that the pin 43 is the center of the arc or swing of the cut off 45 thereof, the movement of the plate or rod 19 and the lug 22 due to the pin 23 and slot 46, will impart a movement during the oscillation of the feeder 25, so that the curved portion 45 will be moved to and from the upper mouth of the aperture 20, the projection 45′ acting in a similar manner to the arms 34 of the agitator 25 to shove the seed toward the aperture 20 according to the direction of oscillation of feeder 25′.

Connected to the axle and the hoppers is the main frame 46' having the intermediate braces 47 while projecting forwardly thereof are the tongue carrying plates 48 and the tongue 49.

Pivoted at 50 to the respective plates 47 of the main frame and at their forward ends, are the arms 51 which are held spaced apart by means of the plates 52 at the rear end thereof, so as to properly carry the driver's seat 53. A plate 54 is connected between the respective arms 51 at their forward pivotal ends while a plate 55 is connected between plates 47 of the main frame, a spring 56 being interposed between the respective plates 54 and 55 so as to normally hold the seat 53 in an upward position, the weight of the driver depressing the spring and moving the said arms 51 downwardly. Connected to the frame 46' by means of the respective arms 57 are the forward ends 58 of the pivotally mounted furrow formers 59, each one of which is disposed in operable relation to its respective spout 36, so as to form a furrow to receive discharges therefrom. In order to properly depress the respective furrow formers 59 by the depression of the spring 56, and the movement downwardly of the arms 51, a transversely disposed bar 60 is connected by means of the arms 61 to the respective arms 51, the said bar 60 being further connected by the respective arms 62 to the furrow formers 59. It will thus be seen that as the driver is seated in the seat 53, that the respective furrow formers 59 will be depressed and placed into engagement with the ground to form the desired furrow in front of their respective discharge spout 36.

In order to adjust the apertures 20 so that various quantities of seed may be ejected therethrough, the plate 63 and adjusting wing screws 64 are provided, the same being connected to and carried by the bars 19 adjacent their respective apertures 20.

By this construction of machine, seeds can be planted in rows, the centers of which vary from 18 inches to 24 inches apart.

From the foregoing description taken in connection with the drawings, it is evident that by the rotation of the shaft 1 when the clutch members are in operable relation, that the gear 10' is rotated so as to impart to the frame R the desired reciprocation, said action moving the respective bars 19 so as to bring the apertures 20 thereof into and out of registration with the apertures 21 and spouts 36, the respective agitators such as 25 and 25', being operated simultaneously to feed the seed to the respective apertures 20 upon both reciprocations. By this means the desired quantity of seed may be fed into the respective apertures 20 and discharged through the respective spouts 36 at the proper time and in the proper quantities, thus feeding the seed to the ground, so many to the hill, with the hills at predetermined distances apart.

This form of drill is especially adapted for use in planting sugar beet seed, where it is desired to get a stand and at the same time have the hills or plants separated at the desired intervals.

By the machine herein illustrated, four drills are operated at the same time so that four rows of seeds are planted. This construction may be varied to plant more or less rows of seed the single bar 19 being used if so desired.

What is claimed is:

1. A beet drill, having a frame, two hoppers carried thereby, an axle rotatably mounted through both hoppers, a seed directing bar slidably mounted in the bottom of each hopper, a seed feeder and agitator disposed in each hopper and in coöperative relation to the bar, a gear carried by the axle, a shaft mounted between the hoppers below the axle, a gear rotatably mounted thereon, said gear being in mesh with the gear of the axle, a frame slidably mounted upon the shaft and operably connected to the bars, and coöperative means carried by the gear of the shaft and sliding frame for imparting a reciprocatory movement to the frame and bar.

2. A beet drill, having a frame, two hoppers carried thereby, an axle rotatably mounted through both hoppers, a seed directing bar slidably mounted in the bottom of each hopper, a seed feeder and agitator disposed in each hopper and in coöperative relation to the bar, a gear carried by the axle, a shaft mounted between the hoppers below the axle, a gear rotatably mounted thereon, said gear being in mesh with the gear of the axle, a frame slidably mounted upon the shaft and operably connected to the bars, two oppositely disposed cams carried by the gear of the shaft, and a pair of arms carried by the frame and disposed in engagement with said cams, whereby the rotation of the cams will impart a reciprocatory movement to the frame and bars.

3. A beet drill, having a frame, two hoppers carried thereby, an axle rotatably mounted through both hoppers, a seed directing bar slidably mounted in the bottom of each hopper, a seed feeder and agitator disposed in each hopper and in coöperative relation to the bar, a gear carried by the axle, a shaft mounted between the hoppers below the axle, a gear rotatably mounted thereon, said gear being in mesh with the gear of the axle, a frame slidably mounted upon the shaft and operably connected to the bars, coöperative means carried by the gear of the shaft and sliding frame for imparting a reciprocatory movement to the frame and bars, and a clutch mechanism mounted upon the axle for connecting and disconnecting the gear therefrom.

4. A beet drill, having a frame, two hoppers carried thereby, an axle rotatably mounted through both hoppers, a seed directing bar slidably mounted in the bottom of each hopper, a seed feeder and agitator disposed in each hopper and in coöperative relation to the bar, a gear carried by the axle, a shaft mounted between the hoppers below the axle, a gear rotatably mounted thereon, said gear being in mesh with the gear of the axle, a frame slidably mounted upon the shaft and operably connected to the bars, two oppositely disposed cams carried by the gear of the shaft, a pair of arms carried by the frame and disposed in engagement with said cams, whereby the rotation of the cams will impart a reciprocatory movement to the frame, and a clutch mechanism mounted upon the axle for connecting and disconnecting the gear therefrom.

5. A beet drill having two hoppers, an axle rotatably mounted through both hoppers, a wheel connected to and for rotating said axle, a gear rotatably mounted upon the axle between the hoppers and provided with a clutch member, a slidably mounted clutch member keyed upon the axle and in coöperative relation to the clutch member of the gear, a shaft mounted between the hoppers below the axle, a gear rotatably mounted thereon and in mesh with the gear of the axle, two oppositely disposed sleeves carried by said last mentioned gear and provided with oppositely disposed cam surfaces, a frame having its terminals slidably connected upon said shaft to straddle the gear thereof, two arms carried by said frame and disposed in coöperative relation with their respective cam surfaces, whereby the rotation of the cam surfaces will impart a reciprocating movement to said frame, and seed feeding and agitating means operably connected to said frame and within the hoppers.

6. A beet drill having a hopper, a reciprocatory bar mounted in the bottom thereof and provided with a seed discharge aperture, the bottom of the hopper being provided with a seed discharge aperture adapted to register with the aperture of the bar, a frame mounted in the hopper, an upstanding lug carried by the bar adjacent to the frame, a seed agitator and feeder connected to said frame, and coöperative means carried by the lug of the bar and said agitator and feeder for imparting a swinging and longitudinal sliding movement to said agitator and feeder during the reciprocation of the bar.

7. A beet drill having a hopper, a reciprocatory bar mounted in the bottom thereof and provided with a seed discharge aperture, the bottom of the hopper being provided with a seed discharge aperture adapted to register with the aperture of the bar, a frame mounted in the hopper, an upstanding lug carried by the bar adjacent to the frame, a seed agitator and feeder connected to said frame, coöperative means carried by the lug of the bar and said agitator and feeder for imparting a swinging and longitudinal sliding movement to said agitator and feeder during the reciprocation of the bar, a discharge spout connected to the bottom of the hopper to receive the seed from the aperture thereof, and a pivotally mounted trap disposed within said spout and having its upper end in coöperative relation with the discharge aperture of the bar, whereby the reciprocation of the bar will swing said trap to provide seed confining pockets at the lower end of both sides of the spout.

8. A beet drill, having a hopper, said hopper being provided with a longitudinally disposed recess and with a discharge aperture, a seed distributing bar mounted for reciprocation within the recessed portion of the bottom of the hopper, said bar being provided with an aperture to be brought in registration with the aperture of the bottom, a frame connected to the bottom to one side of the bar near the discharge aperture of the bottom, an upstanding lug connected to and carried by the bar adjacent the discharge aperture of the bar, two pins carried by the frame and disposed outwardly above the bar, a pin carried by said lug, and a seed agitating and feeding member provided with two oppositely disposed alined slots to fit upon the pin of the lug and the upper pin of the frame, and an intermediate inverted V-shaped slot to fit upon the lower pin of the frame, whereby when the bar is reciprocated the seed agitator and feeder has imparted thereto a sliding and swinging movement.

9. A beet drill, having a hopper, said hopper being provided with a longitudinally disposed recess therein, and with a discharge aperture, a seed distributing bar mounted for reciprocation within the recessed portion of the bottom of the hopper, said bar being provided with an aperture to be brought in registration with the aperture of the bottom, a frame connected to the bottom to one side of the bar near the discharge aperture of the bottom, an upstanding lug connected to and carried by the bar adjacent the discharge aperture of the bar, two pins carried by the frame and disposed outwardly above the bar, a pin carried by said lug, a seed agitating and feeding member provided with two oppositely disposed alined slots to fit upon the pin of the lug and the upper pin of the frame, and an intermediate inverted V-shaped slot to fit upon the lower pin of the frame, whereby as the bar is reciprocated the seed agitator and feeder has imparted thereto a sliding and swinging movement, said seed agitator and feeder being provided with a centrally disposed discharge closing projection, two oppositely disposed feeding prongs, and an upper seed agitating terminal.

10. A beet drill having two hoppers, each of which has two discharge spouts, a pivotally disposed furrow former, one to each spout, a bar connecting all for simultaneous movement, a pivoted seat carrying frame operably connected to said furrow former, and a spring for exerting a tension to raise the furrow formers, the weight of the occupant depressing the furrow formers to ground engaging position.

In testimony that I claim the foregoing as my own, I have hereto affixed my signature in the presence of two witnesses.

NELSON G. LAWSON.

Witnesses:
A. W. GRANT,
NORA AKOLT.

---

Copies of this patent may be obtained for five cents each, by addressing the "Commissioner of Patents, Washington, D. C."